United States Patent [19]

Smith

[11] 4,393,563

[45] Jul. 19, 1983

[54] COLD FORCED SINTERED POWDER METAL ANNULAR BEARING RING BLANKS

[76] Inventor: David T. Smith, 2619 W. Pratt Blvd., Chicago, Ill. 60645

[21] Appl. No.: 266,931

[22] Filed: May 26, 1981

[51] Int. Cl.³ .............................................. B21K 1/04
[52] U.S. Cl. ................... 29/149.5 DP; 29/149.5 PM; 419/32; 419/34; 419/69; 419/43; 419/50; 419/53; 419/28; 419/29
[58] Field of Search ................. 75/221, 211, 214, 226; 29/420, 420.5, 149.5 PM, 149.5 DP; 419/50, 43, 53, 34, 32, 67, 69

[56] References Cited

U.S. PATENT DOCUMENTS

| | | | |
|---|---|---|---|
| 3,626,564 | 12/1971 | Daniel | 29/148.4 |
| 3,782,794 | 1/1974 | Chmura et al. | 308/193 |
| 3,867,751 | 2/1975 | Connell et al. | 29/148.4 |
| 3,874,049 | 4/1975 | Ferguson | 29/149.5 |
| 3,992,763 | 11/1976 | Haynie et al. | 29/420.5 |
| 4,002,471 | 1/1977 | Sarnes et al. | 75/200 |
| 4,006,016 | 2/1977 | Zambrow et al. | 75/221 |
| 4,051,590 | 10/1977 | Halter et al. | 29/420.5 |
| 4,059,879 | 11/1977 | Chmura et al. | 29/148.4 |

Primary Examiner—Lowell A. Larson
Assistant Examiner—V. K. Rising
Attorney, Agent, or Firm—Hill, Van Santen, Steadman, Chiara & Simpson

[57] ABSTRACT

A method and material for the manufacture of improved bearing elements such as annular inner and outer bearing ring blanks for ball, roller and needle bearing assemblies comprising the steps of mixing a powder consisting substantially of iron with ferro-alloy powders of substantially smaller size, each ferro-alloy containing at least 80% iron and the balance being an alloying element, together with graphite powder and a lubricant, compacting the resulting mixture to form a preform, pre-sintering the preform, and then coating the sintered preform with a stop-off and lubricant. The preform is subjected to a plastic deformation of at least 50% in a cold (room temperature) forging operation to produce an article which is at least 98% dense and has approximately the shape of the finished article. This cold forged shape is resintered and annealed, after which the annealed and resintered shape is roll formed into substantially final dimensions. The article can be followed by a suitable heat treatment for hardening the shape.

13 Claims, 6 Drawing Figures

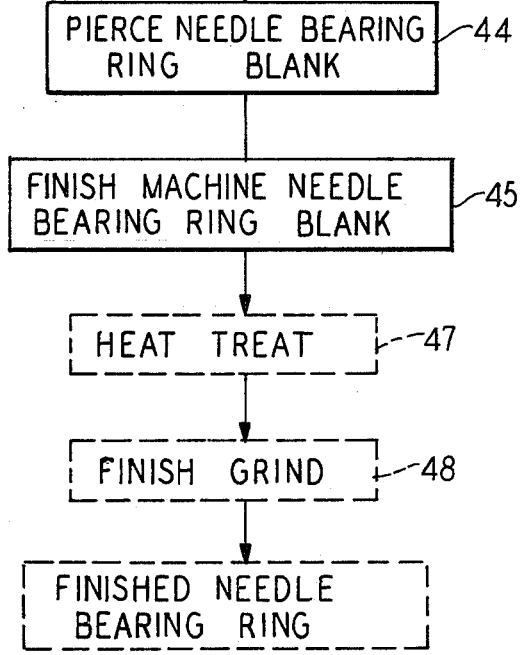
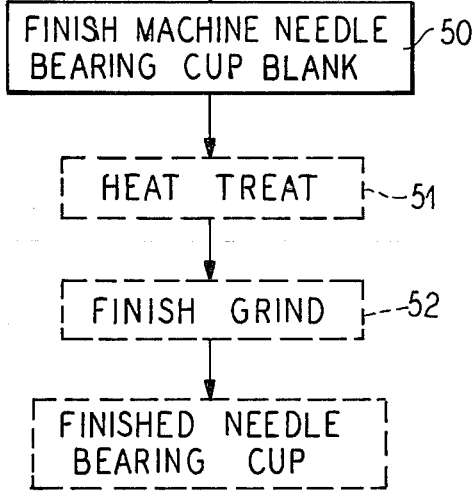
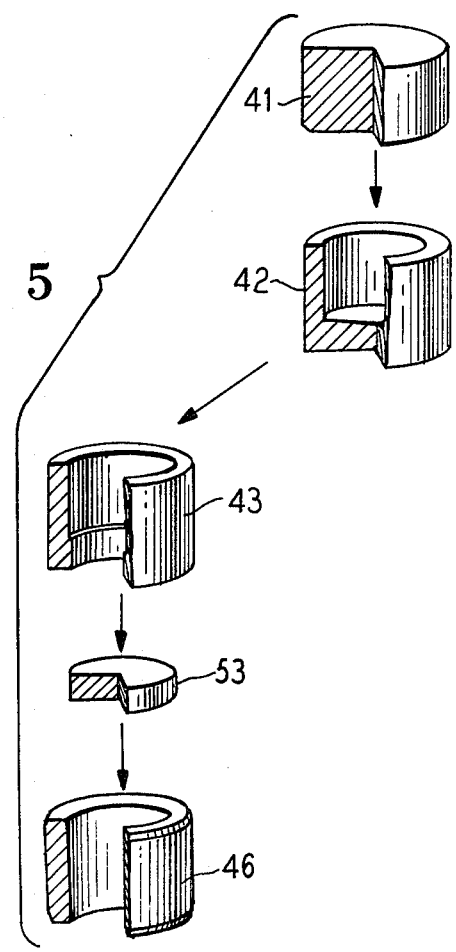
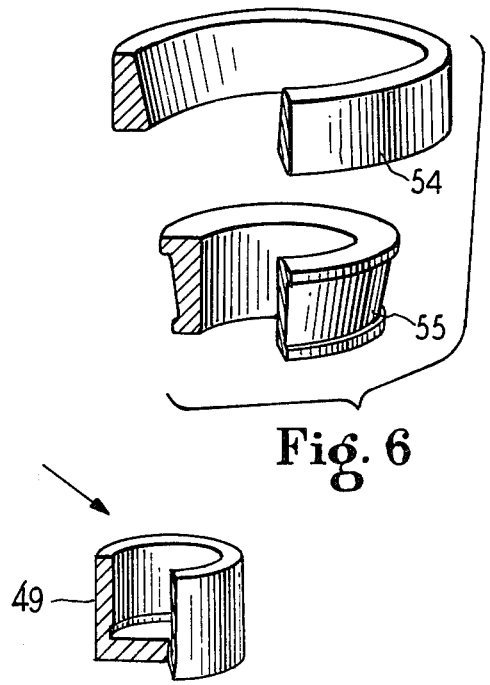

COLD FORCED SINTERED POWDER METAL ANNULAR BEARING RING BLANKS

BACKGROUND OF THE INVENTION

1. Field of the Invention

This invention is in the field of powder metallurgy and forging and involves the manufacture of alloy steel annular bearing elements from cold (room temperature) forged sintered powder metal preforms, using a homogeneous mix of ferro-alloy and iron powders.

2. Description of the Prior Art

At the present time, most ball, roller and needle bearing rings are made from wrought alloy steel tubing, bar stock or plate. Generally, the steel compositions are manufactured in electric furnaces with air melting. For increased bearing life, more highly refined steels or increased alloy content are being used. There are further means provided to enhance bearing life such as by forging ring blanks, special heat treatments, and various mechanical cold working processes.

In recent times, patents have been granted for the manufacture of sintered powder metal annular bearing rings. Some of these are directed to powder metal bearing rings which achieve increased bearing life from local densification, particularly in the region of the raceway. Other patents teach hot forging the ring blank to increase the bearing life. All of the powder metal rings described in this prior art use or prefer to use pre-alloyed metal powders which require comparatively high compacting pressures and increased material cost.

U.S. Pat. No. 3,626,564 to Daniel describes the manufacture of ball bearing races by rolling an annular body within a sizing ring which is initially undersized. The annular body is rolled within a sizing ring by a small internal roll having an external rib shape to produce the channel at the inner surface of the bearing race. As the rolling continues, the radial dimension of the bearing race decreases with a corresponding increase in its diameter until it completely fills the sizing ring. Then the excess stock is extruded axially at one side only of the race, with the opposite side being restrained by a flange on the sizing ring.

Chmura et al U.S. Pat. No. 3,782,794 is one of the patents dealing with antifriction bearing rings produced from powder metal. In the method there described, a sintered, porous powder metal annular blank is formed with a bearing raceway on a circumferential face by mechanically working a selected area of the face to a suitable depth, thereby producing a dense zone adjacent to the bottom of the raceway, while retaining the remaining portion of the sintered metal as a substantially porous structure having a relatively low density.

In U.S. Pat. No. 3,867,751 Connell et al describe the formation of inner and outer bearing rings by roll forming of a sintered metal blank which densifies the ring in the bearing areas.

U.S. Pat. No. 3,874,049 to Ferguson describes a method of forming powder metal parts into bearings in which a sintered preform is cold formed and during such forming shear forces are applied to the surface of the preform in the area of the bearing surface by means of a movable die which penetrates and wipes along the bearing surface area of the preform.

U.S. Pat. No. 3,992,763 to Haynie et al describes a method of making powder metal bearings in which a briquetted powder metal preform is carburized prior to hot forging to substantially increase the initial carbon content and the forged part is cooled by quenching to obtain a predetermined case depth.

Another method of making a forged powder iron article is described in Sarnes et al U.S. Pat. No. 4,002,471. In this disclosure, a pre-alloyed metal powder is compressed into a preform which is sintered and then heated to a temperature above its austenizing temperature. While the preform is at this temperature, it is hot forged and then cooled to its austenizing temperature whereupon it is quenched to produce the finished article.

Zambrow et al U.S. Pat. No. 4,006,016 describes a method of forming powder metal into structural parts wherein pre-alloyed steel powder is pressed into a preform, compacted, and then heat treated. The preform is at a temperature of 2100° F. when it is hot forged in a preheated forming die to produce a metal part having a density in excess of 99% of theoretical density.

U.S. Pat. No. 4,051,590 to Halter et al deals with an automated method of hot forging articles from powder metal preforms in which the preforms are automatically passed through an induction heating device, and then to a pair of dies where they are forged into finished articles. This disclosure is directed essentially to the method of automating the hot forging operation.

Finally, Chmura et al U.S. Pat. No. 4,059,879 describes a method said to be suitable for the production of annular bearing rings in which a sintered porous powder metal compact is partially densified while other portions of the powder metal body are confined so as to inhibit growth of the powder metal body during working and inhibiting cracking.

SUMMARY OF THE INVENTION

The present invention provides a method for producing ball, roller and needle type bearing ring blanks from sintered powder metal preforms, the metal powder being a mixture of substantially pure iron with relatively smaller mesh size ferro-alloy iron powders of the alloying elements: manganese, nickel, chromium, molybdenum, and vanadium. The individual ferror-alloy powders contain at least 80% by weight iron, but not more than 95% iron. The purpose of mixing a substantially pure iron powder with ferro-alloy powders containing 20% or less of the alloying element is to secure a more complete and uniform dispersion of the alloying powders with the iron powder during the succeeding mixing and sintering operations. Also added are graphite and lubricant powders. After a thorough mixing of all the powders, the mixture is die compacted to form cohesive preforms having special shapes, depending on the particular bearing ring type desired. Next, the preforms are pre-sintered (shot time cycle) to achieve a comparatively limited degree of diffusion of the metal powders and the graphite powder. Following sintering, the preforms are lubricated and dried. Next, the lubricated preforms are cold forged to near final shape, resulting in at least 50% plastic deformation. The massive deformation so performed results in bearing ring blanks which have minimal internal molecular size porosity which, in combination with the smaller amounts of inclusions characteristic of cold worked comingled sintered metal powders produces a relatively longer fatigue life.

After the cold forging operation, a resintering follows to complete the graphite and alloy diffusion plus reducing the hardness resulting from the cold working of the metal. Where necessary, inner and outer ring blanks are die separated, after which raceways and other re-entrant shapes are finished, where necessary, by roll forming and further to restructure the surface microstructure, resulting in minimal surface porosity, minimal surface roughness, and maximum surface uniformity thereby necessitating only minimal depth of metal removal during a finish grinding operation. This lowers the possibility of surface grinding burns which tend to reduce fatigue life.

Subsequent to the roll forming step, the bearing race may be subjected to a heat treatment for hardening the shape, such heat treatment consisting of conventional through hardening or carburizing treatments depending on the bearing material.

The annular bearing ring blanks produced according to the present invention will result in at least a 20% increase in fatigue life over any presently known powder metal, wrought, or hot forged metal bearing rings.

BRIEF DESCRIPTION OF THE DRAWINGS

Several embodiments of the present invention are illustrated in the drawings in which:

FIG. 3 is a flow chart illustrating a variation of the process used to manufacture a needle bearing ring blank.

FIG. 4 is a modification of the process illustrating the steps used in the manufacture of a needle bearing cup blank.

FIG. 5 is an exploded view illustrating the sequences set forth schematically in FIGS. 3 and 4 respectively; and FIG. 6 illustrates finished outer and inner tapered roller bearing rings manufactured by a variation in the tool geometry of the process.

DESCRIPTION OF THE PREFERRED EMBODIMENTS

Figure 1:
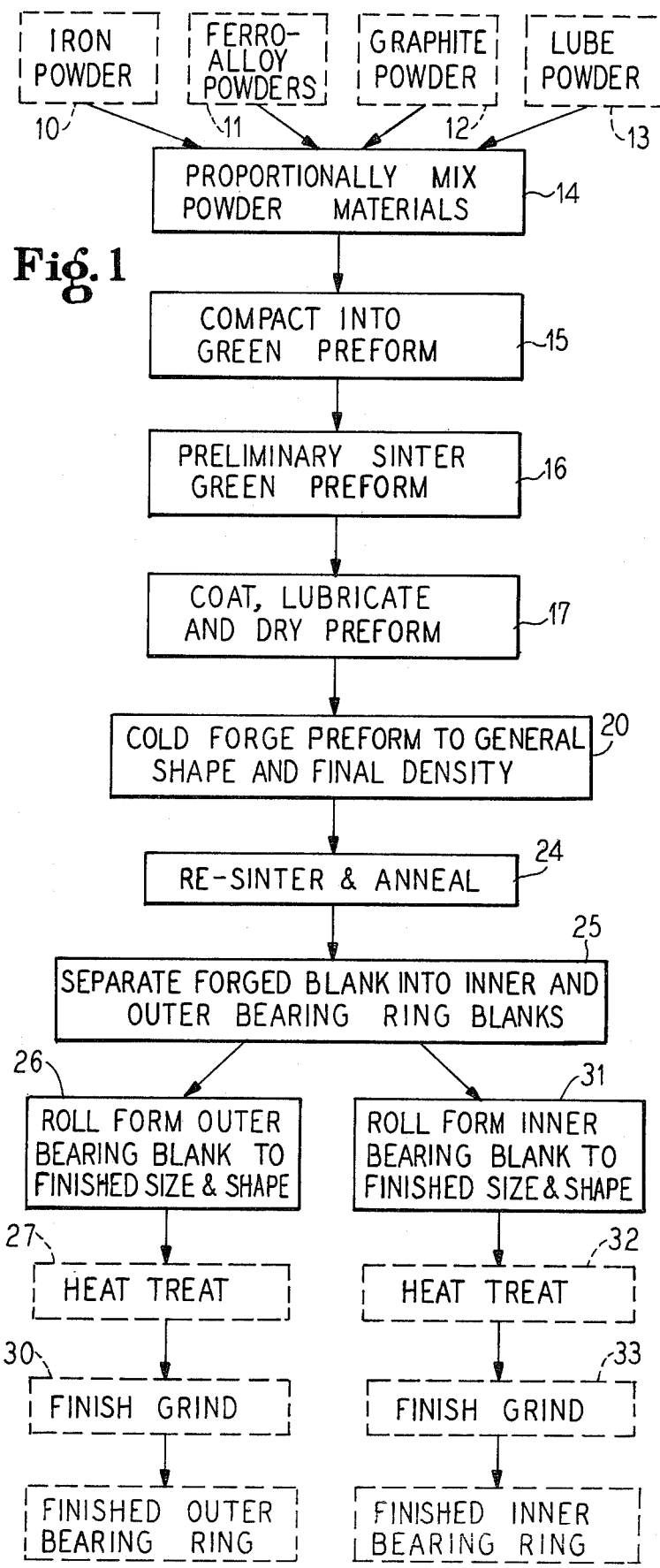
FIG. 1 is a flow chart illustrating the process steps in which the inner and outer bearing ring blanks of a ball or roller bearing assembly can be made using the process of the present invention.

Referring to FIG. 1, there is illustrated a source of iron powder 10, a source of ferro-alloy powders 11, a source of graphite powder 12, and a source of lubricating powder 13. The individual ferro-alloy powders contain at least 80% by weight iron with the balance being either one of the metals manganese, nickel, chromium, molybdenum, or vanadium. Preferably, the individual ferro-alloy powders contain at least 90% by weight iron and have a particle size below 200 mesh (74 micron).

Most wrought bearing steel compositions contain less than 4% by weight of alloying metals. In the process of melting these bearing steels, ferro-alloys are added, whose ratios of iron to alloy range from approximately 1:1 and 2.2 to 1.

In this invention, the ratio of iron to the alloying metal to make the various ferro-alloys is at least 3.5 to 1. As a result of the higher proportions of iron to the alloy metal, the composition gradients normally found in comingled powders is substantially reduced.

The exact proportions between the iron powder, ferro-alloy powders, and the graphite powder will vary depending upon the type of the bearing ring which is to be produced. For example, the relative amounts of the various metal powders can be proportioned to produce standard bearing steels such as shown following.

| AISI & SAE NO. | CARBON | MANGANESE | NICKEL | CHROMIUM | MOLYBDENUM | IRON |
|---|---|---|---|---|---|---|
| 52100 | 0.98–1.10 | 0.25–0.45 | — | 1.30–1.60 | — | Balance |
| 8620 | 0.18–0.23 | 0.70–0.90 | 0.40–0.70 | 0.40–0.60 | 0.15–0.25 | Balance |

TYPICAL (AISI-SAE) CHEMICAL COMPOSITIONS OF METALS USED IN THE MANUFACTURE OF BALL, ROLLER AND NEEDLE ANNULAR BEARING RINGS

The average particle size of the ferro-alloy powders should be smaller than the average particle size of the iron powder. In accordance with the present invention, the average particle size of the ferro-alloys may range from about −200 to −325 mesh (74 to 44 microns) while the iron powder may be a standard −100 mesh size powder having an approximate screen analysis as follows:

+80 mesh (177 microns): 1%
−80+100 (149 microns): 4%
−100+140 (105 microns): 20%
−140+200 (74 microns): 27%
−200+325 (44 microns): 24%
−325 mesh: 24%

Graphite is added to the metal powder mix in quantities ranging from 0.40 to 1.10% depending on the particular bearing type.

The lubricating powder can be a conventional lubricating powder such as zinc stearate.

The succeeding step as illustrated in FIG. 1 is a mixing of all the powder materials in a mixing stage 14. This is followed by compacting the homogeneous mixture into a green preform as set forth in stage 15 of FIG. 1. Typically, the conditions in this stage range from about 40 to 60 tons/sq. in. (552 to 827 MPa). The green preform which results is then pre-sintered as illustrated in stage 16. Typical conditions for this pre-sintering are a temperature of 2050° F. (1110° C.), a duration of 15 to 20 minutes, and a neutral to reducing atmosphere. After pre-sintering the preforms which result have the ability of being subjected to maximum malleability and ductility limits while being forged at room temperature to final shape without being frangible or friable.

In the next stage, illustrated at reference numeral 17, the part is given a stop-off coating which serves as a base for the lubricant used in the succeeding cold forging stage. Such a coating can consist of zinc phosphate reacted with a fatty acid to form a zinc stearate lubricant. After drying, the part is ready for cold forging. In the manufacture of ball bearing races, the part at this stage may have the appearance shown in FIG. 2 in the first view, consisting of an annulus 18 having an inner annular flange portion 19.

Stage 20 consists of a cold forging (room temperature) of the part to the general shape required in the final article, and at a density at least approaching final density. In this stage, the cold forging is sufficiently severe to achieve a plastic deformation of at least 50% by a combination of lateral and vertical flow and produce an article being at least 98% dense. This multi-directional metal flow is the main contributing factor to achieving at least 98% plus uniform densification, resulting in the nearly complete and uniform closing of both particle and interparticle porosity, and thereby increasing the rolling element fatigue life an estimated 20% over conventionally processed bearing rings. The percentage of plastic deformation is defined as the ratio of the plan area of the preform compared with the total developed area of the cold forged bearing ring blank. Although simultaneous cold forging of inner and outer bearing rings has been accomplished using wrought metal blanks, this invention reveals that sintered preforms as described can also be massively cold worked without the usual resulting fracture associated with severe cold working of porous structures which act as stress raisers.

It should be observed that the annulus 18 has a top surface which is entirely flat. This flat surface is instrumental in preventing the fracture of the preform.

The cold forging is typically carried out at pressures of 110 to 130 tons/sq. in. (1517 to 1793 MPa). The cold forging produces a shape also shown in FIG. 2 as constituting an outer annulus 21, and an inner annulus 22 joined by a bridging portion 23.

The next step identified at reference numeral 24 consists of a re-sintering and annealing operation. This re-sintering takes place for a period of 20 to 40 minutes at a temperature typically of 2050° F. (1110° C.) in a neutral or reducing atmosphere. The annealing typically is performed by slow cooling from a temperature above 1500° F. (815° C.), (exact temperature dependent on carbon and alloy content). The additional sintering operation completes the graphite diffusion and the alloy diffusion in addition to which the hardness resulting from the previous cold forging operation is reduced.

Figure 2:
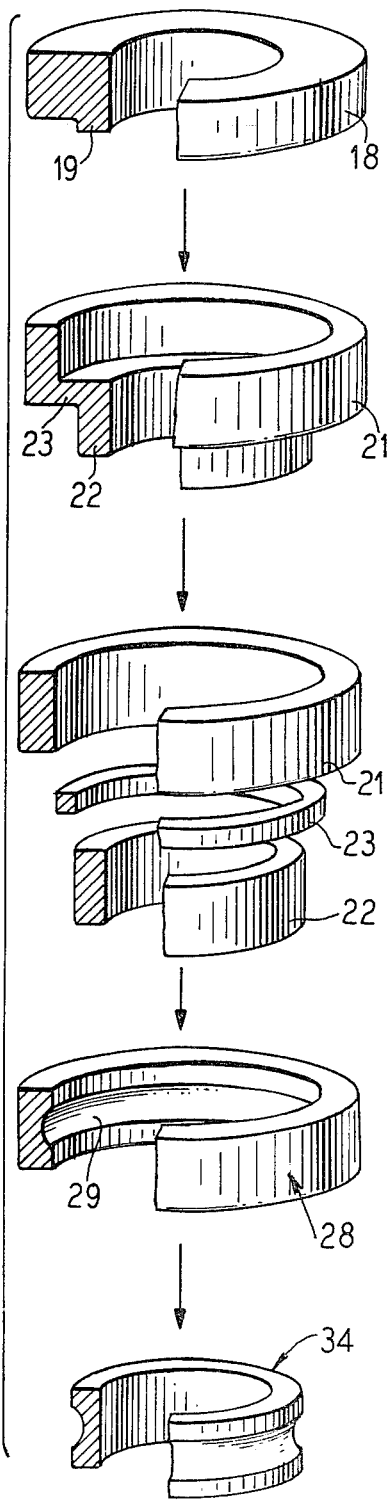
FIG. 2 is an exploded view illustrating the typical geometry of inner and outer ball bearing ring blanks as they progress through the sequence illustrated in FIG. 1.

The succeeding stage identified at reference numeral 25 consists in separating the part into inner and outer bearing rings which is shown graphically in FIG. 2. The part may be put into a conventional punch and die assembly and severed into three pieces, consisting of the outer annulus 21, the inner annulus 22, and the bridging part 23.

In the next stage identified at reference numeral 26, the outer annulus 21 is conventionally roll formed. The rolls used perform a multiplicity of operations such as rolling the inner and outer diameters to a pre-grinding size. When rolling the inner and outer diameters to size, the width is expanded to a pre-grinding size. When further rolling the inner and outer diameters, all re-entrant shapes where necessary are formed such as the ball raceway, the inner and outer corner radii, shield and seal grooves for the ball bearing rings, and shoulders for the roller and needle bearing rings. Further, by rolling the bearing ring inner and outer diameters and width to size, the tolerance band as established by the cold forging operation is reduced by at least 50% less than conventional machining practice, thereby reducing the final grinding operation by at least 60 to 70%.

The roll forming deformation also accomplishes features which are not usually visible such as generating a fiber flow parallel to the raceway, restructuring surface micro-structure and thereby achieving minimal surface porosity, minimal surface roughness, and maximum surface uniformity, all of which assure minimal distortion following heat treatment. Since rolling to finished shape reduces the usual depth of finish grinding required as compared with conventionally processed bearing rings, minimal grinding stock results; the probability and degree of surface grinding burns and subsequent minute cracks are lowered as compared with conventional bearing manufacturing allowances. The net result of these manufacturing improvements further assures a minimum of 20% increase of rolling element fatigue life estimated for this invention as compared to conventionally manufactured bearing rings.

A conventional heat treatment 27 may follow the roll forming operation which has now produced an outer bearing ring 28 including its raceway 29. This heat treatment can be followed as indicated at reference numeral 30 with a finish grinding operation, if necessary or desired.

The inner bearing ring is formed from the inner annulus 22 in substantially the same way, namely, by roll forming the bearing ring to finished size and shape as indicated at reference numeral 31, heat treating as at reference numeral 32, and a finish grinding operation 33 to produce the finished inner bearing ring 34 ilustrated at the bottom of FIG. 2.

FIGS. 3 and 4 of the drawings refer to a modified form of the flow chart of FIG. 1 wherein needle bearing rings and needle bearing cups are being manufactured. In both instances, the sequence of operations is the same as in this instance, however, as illustrated in FIG. 5, the starting preform is a cylinder 41 which, upon cold forging, is formed into a cup shape illustrated at reference numeral 42. In forming the needle bearing ring, the cup-shaped part 42 is pierced to form a sleeve 43, leaving scrap slug 53. The piercing step is illustrated at reference numeral 44. Next, there is a finish machining operation identified at reference numeral 45 which produces the finished needle bearing ring part 46 illustrated in FIG. 5. Optionally, the finish machining step can be followed by a conventional heat treating step 47 and a finish grinding step 48.

In the formation of the needle bearing cup part, as illustrated in FIG. 4, the cup 42 is subjected to a finish machining operation to produce the bearing cup 49 illustrated in FIG. 5. The method step is represented by the block 50 in FIG. 4. Optionally, this is followed by an additional heat treating step 51 and a finish grinding step 52 as in the case of the needle bearing ring. FIG. 6 of the drawings refers to the like form of the flow chart of FIG. 1 wherein finished annular outer tapered roller bearing ring 54 and finished annular inner tapered roller bearing ring 55 are being manufactured by a variation in the tool geometry of the process. In both instances, the sequence of operations is the same as the exploded view in FIG. 2.

The process of the present invention improves both metallurgical and mechanical manufacturing process techniques for producing cold forged sintered powder metal roller, ball, and needle bearing ring blanks. The process produces uniformly fully dense alloy steel annular bearing ring blanks by massive plastic deformation without the use of heat. The use of the roll forming operation to form all re-entrant surfaces and corner radii further assures increased bearing life.

The pre-mixing of the iron powder with ferro-alloys produces a nearly inclusion-free steel. This, in turn, provides increased bearing life, requires somewhat less compacting pressure to achieve a higher green density in the original preform and lessens the raw material cost.

The bearing ring blanks produced according to the present invention are estimated to possess at least a 20% higher fatigue life than any presently known powdered metal, wrought or hot forged metal bearing assembly.

It should be evident that various modifications can be made to the described embodiments without departing from the scope of the present invention.

I claim as my invention:

1. A method for the manufacture of improved bearing elements, without high temperature forming which comprises the following steps:
   (1) combining (a) powders consisting substantially of iron with (b) ferro-alloy powders each containing a maximum of 80% by weight iron and the balance of each alloying powder being either manganese, nickel, chromium, molybdenum, or vanadium, (c) graphite powder, and (d) a lubricant,
   (2) mixing the resulting combination,
   (3) compacting the resulting mixture to produce a preform,
   (4) pre-sintering the preform,
   (5) coating the sintered preform with a stop-off coating and lubricant,
   (6) cold forging the coated and lubricated preform to achieve a plastic deformation of at least 50%, through a combination of lateral and vertical flow and produce an article being at least 98% dense and approximating the shape of the finished article,
   (7) resintering the cold forged shape,
   (8) annealing the resintered shape, and
   (9) roll forming the annealed and resintered shape into substantially final dimensions.
2. A method according to claim 1 in which:
said ferro-alloy powders have an average particle size smaller than the average particle size of said iron powder.
3. A method according to claim 1 in which:
said ferro-alloy powders contain up to 95% by weight iron.
4. A method according to claim 1 in which:
said ferro-alloy powders have a particle size below 200 mesh (74 micron).
5. A method according to claim 1 in which:
said roll forming step (9) is followed by a heat treatment for hardening the shape.
6. A method according to claim 5 in which:
said heat treatment consists of a through hardening treatment.
7. A method according to claim 5 in which:
said heat treatment consists of a carburizing treatment.
8. A method according to claim 1 in which:
said cold forging step (6) is carried out at a pressure of from 110 to 130 tons/sq. in. (1517 to 1793 MPa).
9. A method according to claim 1 in which:
said compacting step (3) is carried out at a pressure of from 40 to 60 tons/sq. in. (552 to 827 MPa).
10. A method according to claim 1 in which:
said shape is parted into several pieces between annealing step (8) and roll forming step (9).
11. A method according to claim 1 in which said bearing element is an inner or outer ring for a ball bearing assembly.
12. A method according to claim 1 in which said bearing element is a needle bearing ring or cup.
13. A method according to claim 1 in which said bearing element is an inner or outer ring for a roller bearing assembly.

* * * * *

UNITED STATES PATENT AND TRADEMARK OFFICE
CERTIFICATE OF CORRECTION

PATENT NO.   : 4,393,563
DATED        : July 19, 1983
INVENTOR(S)  : David T. Smith It is certified that error appears in the above—identified patent and that said Letters Patent is hereby corrected as shown below:

In the title, change "FORCED" to read --FORGED--.

Column 2, line 55, change "shot" to read --short--.

Signed and Sealed this

Eleventh Day of October 1983

[SEAL]

Attest:

GERALD J. MOSSINGHOFF

Attesting Officer        Commissioner of Patents and Trademarks